(12) United States Patent
Liu et al.

(10) Patent No.: US 6,804,816 B1
(45) Date of Patent: Oct. 12, 2004

(54) METHOD AND TEMPLATE FOR DEVELOPING DEVICE-CENTRIC NETWORK MANAGEMENT APPLICATIONS

(75) Inventors: Chunguang (Chris) Liu, Fremont, CA (US); Gurminder Singh, Union City, CA (US); Yansheng (Jason) Jiang, Fremont, CA (US)

(73) Assignee: Cisco Technology, Inc., San Jose, CA (US)

(*) Notice: Subject to any disclaimer, the term of this patent is extended or adjusted under 35 U.S.C. 154(b) by 560 days.

(21) Appl. No.: 09/746,673

(22) Filed: Dec. 21, 2000

(51) Int. Cl.$^7$ ................................................ G06F 9/00
(52) U.S. Cl. ...................................... 719/311; 709/223
(58) Field of Search ................................ 717/171, 176; 709/223, 321, 202–204, 220–229; 705/1, 203–228; 719/310, 320, 311

(56) References Cited

U.S. PATENT DOCUMENTS

| | | | | |
|---|---|---|---|---|
| 5,987,513 | A | * 11/1999 | Prithviraj et al. | ........... 709/223 |
| 6,308,205 | B1 | * 10/2001 | Carcerano et al. | .......... 709/221 |
| 6,397,245 | B1 | * 5/2002 | Johnson et al. | ............. 709/203 |
| 6,647,410 | B1 | * 11/2003 | Scimone et al. | ............ 709/206 |
| 2002/0019844 | A1 | * 2/2002 | Kurowski et al. | .......... 709/201 |
| 2002/0123966 | A1 | * 9/2002 | Chu et al. | ...................... 705/43 |
| 2003/0014265 | A1 | * 1/2003 | Landry et al. | .................. 705/1 |

* cited by examiner

Primary Examiner—Meng-Al T. An
Assistant Examiner—Li Zhen
(74) Attorney, Agent, or Firm—Hickman Palermo Truong & Becker LLP

(57) ABSTRACT

Techniques for developing device-centric network management applications include a template. A computer platform includes one or more processors and an operating system. The template includes one or more sequences of statements of a platform-dependent scripting language. The statements are processed by a Web server executing on the platform. The statements cause the Web server to define a plurality of standard management methods and call at least a first standard management method. The statements also cause the Web server to define page level variables for holding in memory values used as parameters for the standard management methods. The template also includes a place to insert application-specific statements for presenting network information to a Web-based client process and for receiving input from the Web-based client process.

A developer inserts the application-specific statements. The resulting Web resource is stored on a Windows platform connected to the network for access by a Web server on the platform in response to a request from the Web-based client process. Using this template, robust network management applications can be developed efficiently for certain platforms, such as windows platforms, with most of the application-specific development confined to generating a user interface, such as with HTML forms, to present the network information to the user and to receive user input and commands.

34 Claims, 8 Drawing Sheets

METHOD AND TEMPLATE FOR DEVELOPING DEVICE-CENTRIC NETWORK MANAGEMENT APPLICATIONS

FIELD OF INVENTION

The present invention generally relates to network management. The invention relates more specifically to a method and template for developing device-centric network management applications using server processes on the network.

BACKGROUND OF THE INVENTION

A network consists of several computing devices connected by certain types of cables in a certain architecture and communicating using a certain protocol. An internetwork, like the Internet or a telecommunications private branch exchange (PBX), involves the connection of various networks to each other using one or more networking devices, such as repeaters, switches, bridges, routers and gateways, to make optimum use of available bandwidth and to convert as necessary from one protocol to another. Bandwidth is a measure of potential throughput on a cable, measured, for example, in megabits per second.

Some of these network devices involve programmable processors with corresponding software instruction sets to control operations of the processors. Many of these devices execute a network operating system for controlling the functionality of the device. For example, devices manufactured by Cisco Systems, Inc. operate under control of the Cisco Internetworking Operating System (IOS). Some may include one or more applications programs to provide certain functions.

Network management involves, in part, tracking the topology of the connections between network devices at nodes of the network, configuring the network devices to perform the various functions needed at each node, and checking on the status of the network devices at the nodes at regular times or in response to a request. Often, a computer on a control network connecting the network devices provides centralized network management using a network administration application interacting with the network operating system on the various devices. The controlling network may be the same as the network, as on the Internet. In some circumstances, the controlling network with the central network management computer is a separate network. For example, in an IPX network, the network controlling the network devices is separate from the telecommunications network controlled by the network devices.

Networks are often used to connect relatively inexpensive, low computing power devices, such as personal computer (PC) laptops and handheld devices that run relatively thin client processes, with high powered server devices that run a large number of server processes. A client process sends a message requesting a computing resource to a server process executing on a different device on the network. The server process then provides the requested resource, returning a result, if any, in a response message.

Computer resources include one or more printers or other peripheral devices, data files, or program files, for example. World Wide Web (WWW) browsers are examples of a standard client process communicating using hypertext transfer protocol (HTTP) for resources in the form of Web pages written in HyperText Markup Language (HTML). A great number of Web pages have been developed and are currently available on the Internet. The browsers allow text, graphic, and multi-media information to be received from one or more servers and to be displayed on the PC or other computer executing the browser. Extra functions such as dialog boxes for obtaining user input and performing client-side data validation, and other dynamically generated pages, are provided by programs sent to the browser and launched by the browser. These programs include Java® bytecode for execution by a Java virtual machine installed on the client device, and programs written in a scripting language and launched through Common Gateway Interface (CGI).

To provide network administrators with greater access to network management functions, for example, while traveling with a laptop computer, it is desirable to allow a network administrator to perform network management using a standard Web browser with some client-side scripts. Traditionally, such network management applications are developed using Java or a scripting language with CGI on various devices running the UNIX operating system.

With the release of the Windows 2000 operating system, the Microsoft Internet Information Server (IIS) provides an alternative platform on which to develop applications for access via a Web browser. This platform utilizes a directory system called Active Directory, a database access layer comprising Active Data Objects (ADO), and a scripting language called Active Server Pages (ASP). However, the recent introduction of this platform, compared to UNIX platforms, means that network management tools are not available for developing network management applications on Windows 2000.

In particular, it is desirable to make network management applications device-centric. That is, it is desirable to query and obtain device state information directly from the devices on the network, rather than query a centralized database that may be between updates at the time the database is queried. In addition, it is desirable to respond to events originating in the devices, such as operational errors, as well as to requests originated by the client process. Since ASP is commonly used with ADO in database-centric applications, extra effort is required to develop the code to support device-centric interactions. Since ASP is based on client-generated requests, extra effort is required to develop the code to support device-generated events.

Furthermore, ASP is designed for the Windows operating system. This allows the resulting scripts to run efficiently on the Windows platform, requiring less memory size and central processing unit (CPU) clock time than platform independent code like Java. However, an approach that relies on ASP is not moved to another platform as readily as Java.

Therefore, it is desirable to re-use as much code from one ASP application as possible in a different ASP application. This allows new, efficient platform-dependent applications to be developed more quickly than without re-usable code. However, since ASP is not an object-oriented language, like C++ or Java, ASP does not provide built-in encapsulation or inheritance. In object-oriented languages, the features of encapsulation enhance the reusability and reduce the interdependencies of the produced code.

Based on the foregoing, there is a clear need for techniques to increase the usefulness of platform dependent scripts, like ASP, in applications for Web-based, device-centric network management.

SUMMARY OF THE INVENTION

The foregoing needs, and other needs and objects that will become apparent for the following description, are achieved in the present invention, which comprises, in one aspect, a software template for developing a platform-dependent network management Web resource.

A computer platform includes one or more processors and an operating system. The template includes one or more sequences of statements of a platform-dependent scripting language. The statements are processed by a Web server executing on the platform. The statements cause the Web server to define a plurality of standard management methods and call at least a first standard management method. The statements also cause the Web server to define page level variables for holding in memory values used as parameters for the standard management methods. The template also includes a place to insert application-specific statements for presenting network information to a Web-based client process and for receiving input from the Web-based client process.

In another aspect, a method of developing a platform-dependent, Web-based, device-centric network management server includes creating and storing a collection of network device-centric methods in binary modules that are registered with a standard binary interface. The collection is assembled on a platform for controlling a network comprising a hierarchy of network devices. Also assembled on the platform is the template including statements in a platform-dependent scripting language. The statements provide standard management methods, at least one based on the standard binary interface to generate instances of the collection of network device-centric methods. The statements also provide page level variables for holding in memory values used as parameters for the standard binary interface. The template includes a place to insert application specific statements into the Web resource for presenting network information to a Web-based client process and for receiving input from the Web-based client process. The template is then presented to a developer for generating and inserting the application specific statements into the Web resource. The resulting Web resource is stored on the platform connected to the network, for access by a Web server on the platform in response to a request from the Web-based client process on the network.

In another aspect of the invention, a method of developing a platform-dependent, Web-based, device-centric network management server includes retrieving a template for a Web resource. The template includes statements in a platform-dependent scripting language. The statements provide standard management methods. At least one of the standard management methods is based on a platform-dependent standard binary interface to generate instances of a collection of network device-centric methods stored as binary modules. The statements also provide page level variables for holding in memory values used as parameters for the standard binary interface. Application-specific statements are generated by the developer and inserted into the Web resource. The statements also provide a place to insert application-specific statements into the Web resource for presenting network information to a Web-based client process and for receiving input from the Web-based client process. The resulting Web resource is stored on a platform associated with the platform-dependent scripting language, standard binary interface and binary modules. The platform is connected to a network comprising a hierarchy of network devices. The resulting Web resource is for access by a Web server on the platform in response to a request from a Web-based client process on the network.

In another aspect, a network management page for sending to a Web-based client process from a Web based server incorporates a form having a plurality of input fields and a submit button. The form is associated with either a first submit method or a second submit method. The first submit method is for obtaining information about a state of a particular network device. The second submit method is for changing the state of a particular network device. The page is sent to the client process. In response to activation of the submit button in the client process, routines are executed to operate on the particular network device based on which submit method was associated with the form. Using these techniques, a single set of input fields can be designed for both displaying and editing the state of network devices.

In other aspects, the invention encompasses a computer system and an apparatus configured to carry out the foregoing steps.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for developing Web based network management is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Operational Context

The present invention relates to managing network devices, such as routers and switches, using a client process like a Web browser and a server process like a Web server. The invention is illustrated in the context of managing network devices in an IP PBX, but it can be implemented on any network that supports the client-server model.

Figure 1A:
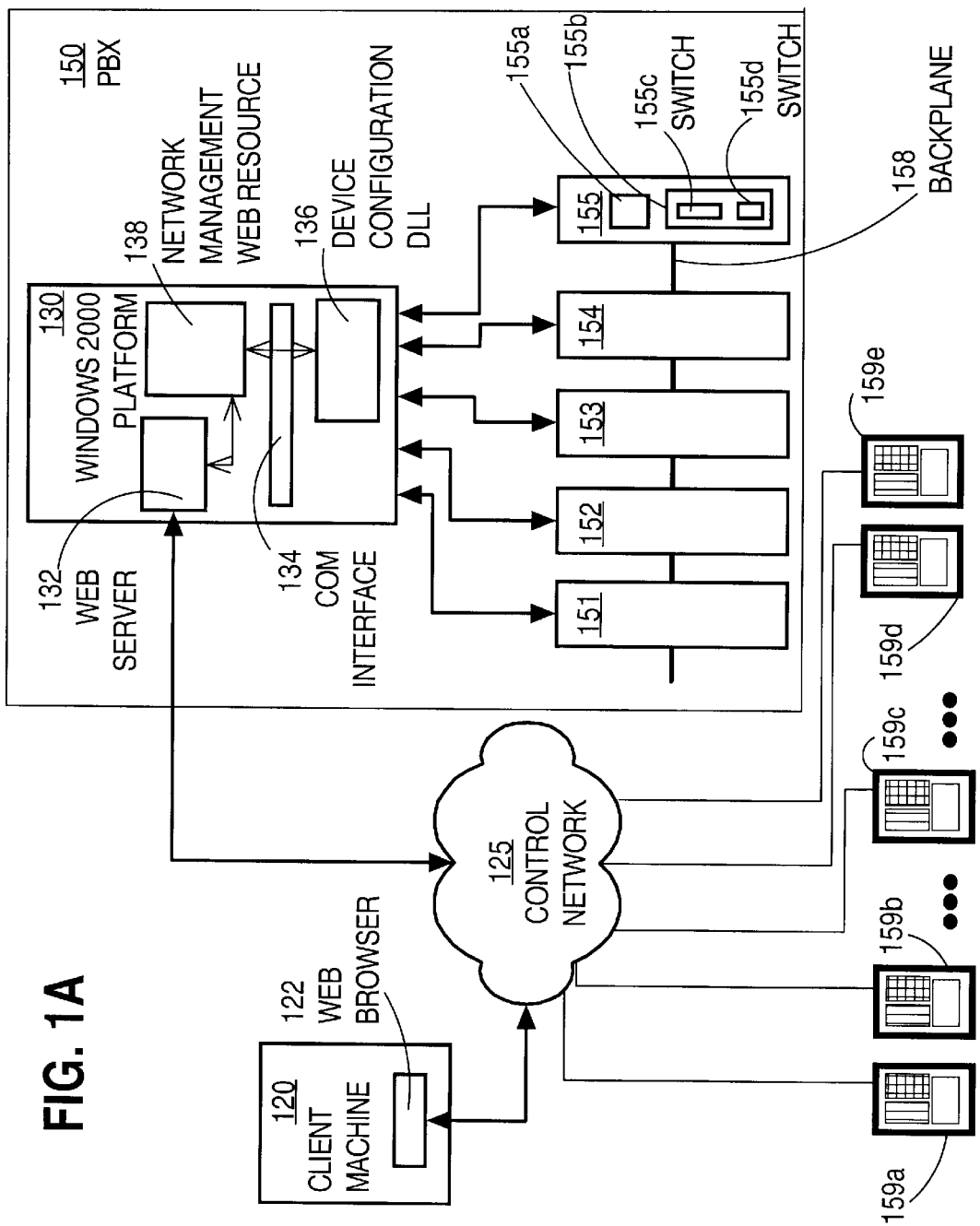
FIG. 1A is a block diagram that illustrates an overview of a control network for network devices in which a web resource formed according to an embodiment may be deployed.

FIG. 1A is a block diagram that illustrates an overview of a control network for network devices in which a web resource formed according to an embodiment may be deployed. A PBX 150 includes one or more circuit cards, 151, 152, 153, 154 and 155, interceding between a back-plane 158 and a bank of telephones 159. The telephones 159 also are indirectly communicatively coupled to control network 125, through connections that are omitted in FIG. 1A for clarity. Each circuit card is a network device made up of one or more components. For example, network card 155 is a router with network modules 155a, 155b. For example, router 155b includes switch 155c and switch 155d. As used here, the term network device covers any network hardware unit, hardware card, component or subcomponent that can be separately queried or configured.

The operation of the network devices in the PBX 150 are controlled by configuration settings for the various devices that are determined by the software through a separate control network 125. Control network 125 may be, for example, an IP network. Connected to the control network 125 is a computer device running a network management application. For example, in FIG. 1A, the Microsoft Windows 2000 platform 130 serves as a computer device running a network management application. In one arrangement, the network management application is a server process that can be accessed from a client process executing on any computing device connected to the control network 125. For example, the client process may be Web browser 122 executing on client machine 120 such as a personal computer. In this case, it is common for the network management application to comprise a network management Web resource 138 that a Web server 132 invokes in response to a request from Web browser 122. In some implementations, the control network 125 is the Internet to provide a network administrator with global access to network management functions.

A platform comprises hardware components including a processor, and operating system software for interacting with the hardware components. A UNIX platform utilizes a UNIX operating system. The host of Web server 132 may be a UNIX platform.

When the Web server 132 is hosted on a Windows 2000 platform, a network management Web resource cannot use a scripting language for UNIX platforms. Instead, the network management Web resource must utilize a scripting language compatible with Windows 2000. To provide cross platform portability, Java can be employed on any platform for which a Java virtual machine has been written and is executing. If a Java virtual machine is available for the platform chosen to host the Web server, then a network management Web resource written in Java can be carried to, and used on, the platform. However, the cost of this cross platform portability is increased consumption of computational resources and slower execution speed.

Therefore, to utilize the efficiency of a scripting language native to a certain platform, it is desirable to build the network management Web resource 138 in the native scripting language, such as Active Server Pages (ASP) for the Windows 2000 platform 130. Thus, the network management Web resource 138 is written in a platform-dependent scripting language.

Every scripting language has some disadvantages. First, the statements are in a high level language understood by humans and must be converted to a series of machine executable instructions, such as by using an interpreter process. This conversion of scripting language statements consumes computational resources and clock cycles. Second, the statements are in plain view to any user connected to the control network who knows the Universal Resource Locator (URL) or other address of the network management Web resource 138. This makes it easy for such a user to discover the business logic and infer equipment details that the manufacturer of the network devices may wish to protect.

In addition, because ASP for Windows 2000 has only recently enabled development of a network management Web resource, much network device configuration software already available and tested does not use ASP. It is costly for suppliers of network devices to rewrite programs that provide the desired functionality into a new language and test the new software to obtain the level of robustness and reliability already attained by the existing software. In particular, it is expected to be costly to write ASP code that is device-centric.

To protect the business logic and technological details possessed by the supplier of network devices, and to reuse reliable and robust software already on hand, according to one embodiment, binary code of existing software is used, such as the dynamic link libraries (DLL) for network device configuration. A DLL contains binary object code, which uses platform-dependent instructions and relative memory addressing. At run-time, i.e., dynamically, an application identifies the DLL files it needs, links them together, and converts them to executable code using absolute memory addresses, which can be executed directly by the one or more processors in the platform. In FIG. 1A, the use of existing binary code is represented by the device configuration DLL 136. The device configuration DLL 136 contains logic for generating commands that can be processed by the network device operating system executing on the components and subcomponents of the network cards in the IP PBX 150.

For example, Cisco Systems, Inc. has developed a ConfigMaker application using many functions stored as dynamic link library (DLL) files. The ConfigMaker DLLs make up a powerful collection of functions for controlling the network devices, such as PBX cards 151–155. This control is exercised by issuing commands understood by IOS and sending those commands to the pertinent subcomponents using the address of the subcomponents on the control network 125. Because these DLLs have been used in prior applications, they are well tested and reliable. A new application based on these DLLs is expected to be much more reliable than an application written anew in the same time.

For the network management Web resource 138 to utilize the device configuration DLL 136, an interface is needed between the scripting language in the network management Web resource and the binary module that holds the DLL. Several platforms support a standard binary interface that can be used by a scripting language. Windows 2000 platforms support a component object model (COM) interface. In FIG. 1A, the network management Web resource 138 utilizes the COM interface 134 to deploy the methods in the device configuration DLL 136. Other binary interfaces also may be used.

The arrangement depicted in FIG. 1A provides the advantages of a device dependent scripting language in the network management Web resource 138, the security of binary modules for business logic and technology details in the device configuration DLL 136, the reuse of robust methods, such as device-centric methods, developed for other network applications also in the device configuration DLL 136, and the ease of using a public standard binary interface as in the COM interface 134.

Structural Overview of a Web Resource Template

Techniques of the disclosed embodiments are directed to developing network management Web resources, such as network management Web resource 138, that use a device-dependent scripting language and reuse robust binary modules. In one aspect, the techniques employ a template to develop a network management Web resource.

Figure 1B:
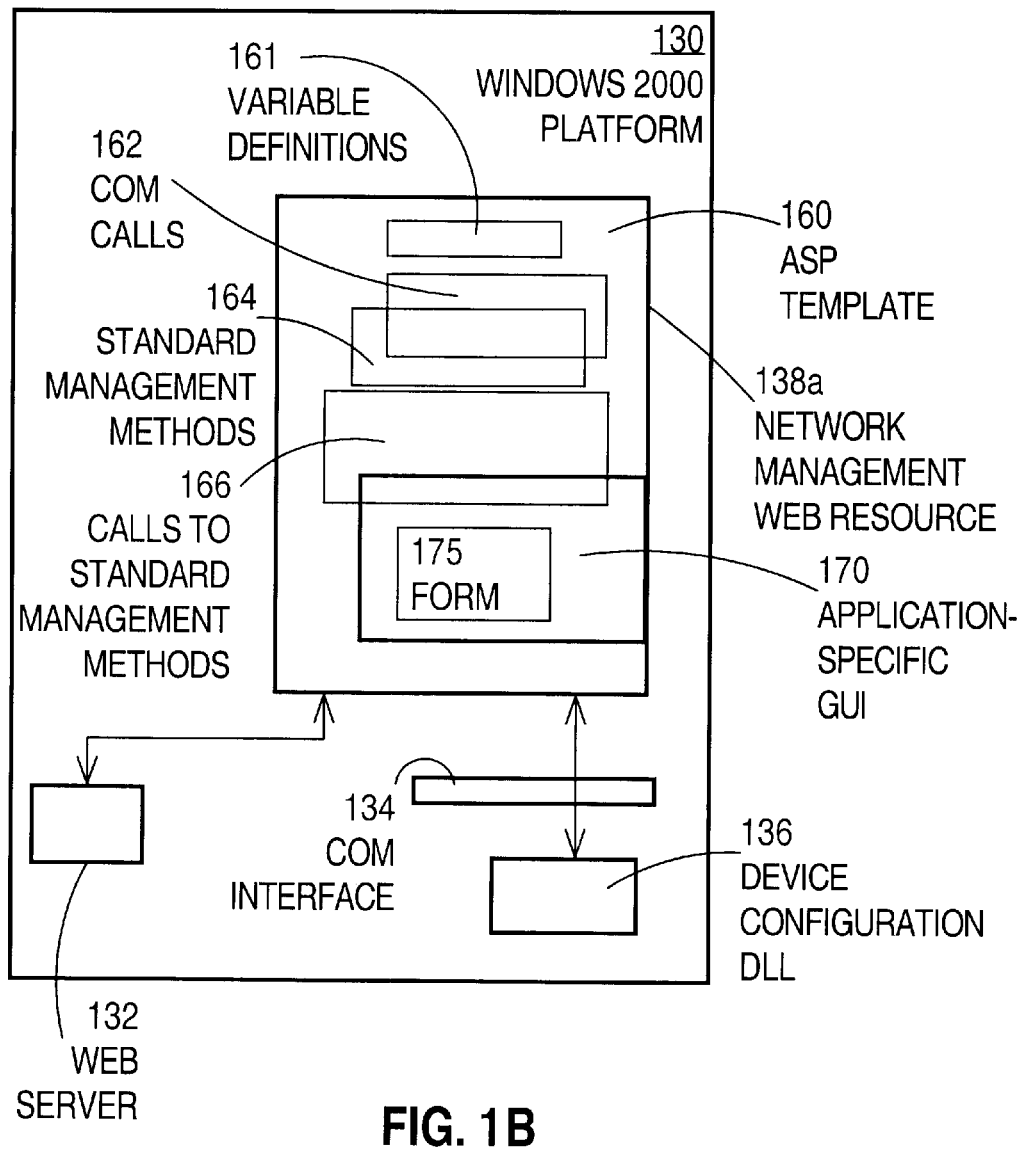
FIG. 1B is a block diagram that illustrates a web resource template according to an embodiment.

FIG. 1B is a block diagram that illustrates a web resource template according to an embodiment. As shown in FIG. 1B, this embodiment of a network management Web resource 138a, for Windows 2000 platform 130, comprises a template 160, written primarily in the device dependent scripting language ASP, and an application-specific graphical user interface (GUI). According to one embodiment, the template 160 is written by one party expert in control of the network devices and is delivered to a developer for storage on the developer's machine and used in building a network management Web resource for a particular application. In this embodiment, the application-specific GUI 170 is generated by the developer and inserted into the template 160 to produce the network management Web resource 138a.

In this design, the template contains variable definitions and assignments, and method definitions and calls, which are common to many network management Web resources.

In FIG. 1B, rectangles inside the network management Web resource 138a represent the structure of the Web resource in terms of blocks of code that share some property, as in a Venn diagram. These rectangles do not imply a particular order for statements or a relative number of statements.

As shown in FIG. 1B, the template 160 includes scripting language statements comprising variable definitions 161, scripting language statements that involve calls to the standard binary interface (COM calls 162), scripting language statements that define standard network management methods 164, and scripting language statements that call the standard network management methods 166.

The illustrated embodiment of the application-specific GUI 170 include statements that describe a form 175, and statements that call the standard management methods, as indicated by the overlap of the rectangle representing statements 166 with the rectangle representing the GUI 170.

The development of new network Web resources, such as network management Web resource 138a, is facilitated by the template 160. Much of the code is already available in the template 160, and the developer for the application may concentrate on the application-specific GUI 170. A variety of functions needed for the application-specific GUI 170 are already defined in the standard management methods definition statements 164.

Functional Overview of a Web Resource Template

Figure 2A:
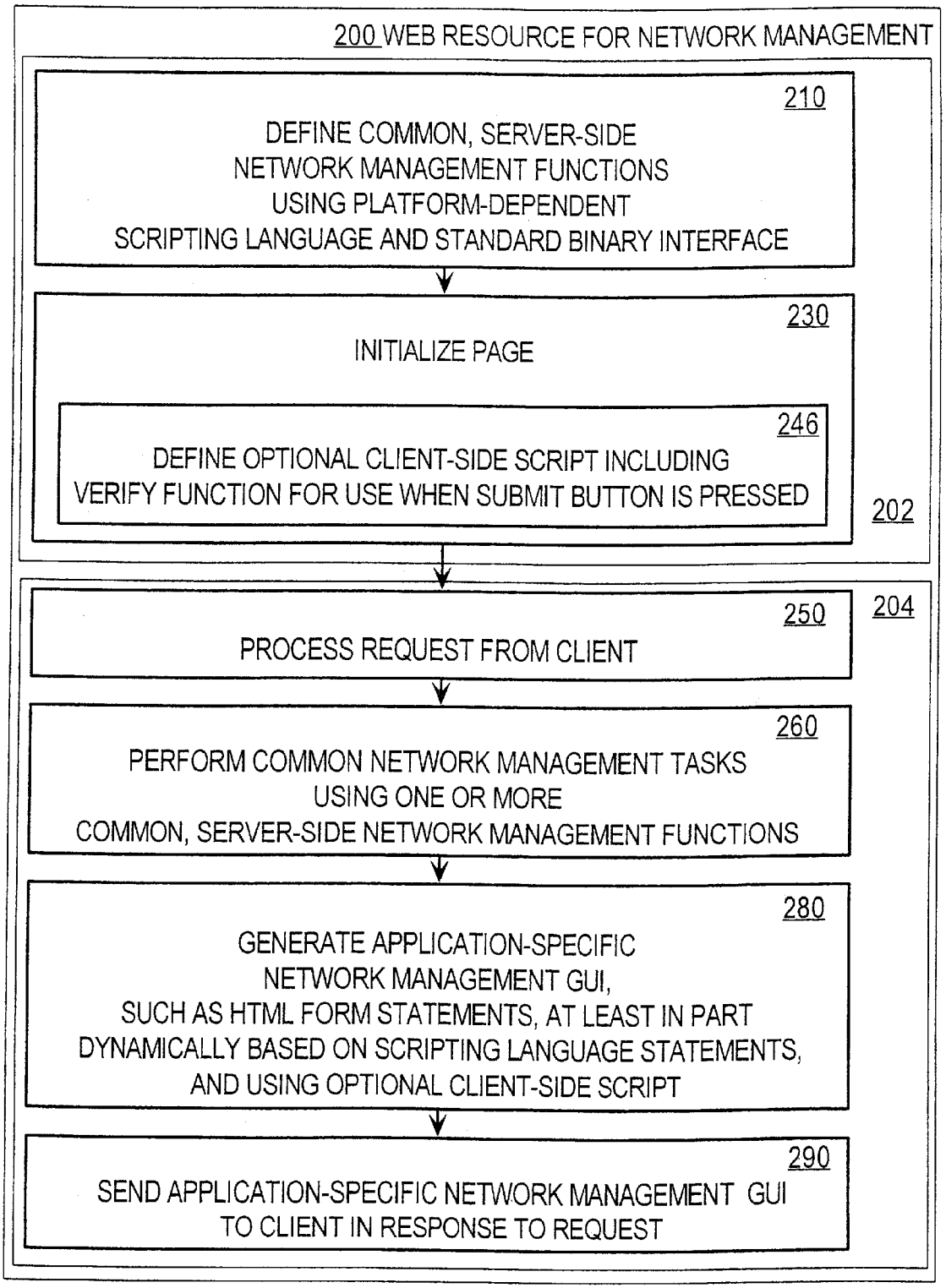
FIG. 2A is a flowchart that illustrates high level methods of a web resource template according to an embodiment.

The statements 161, 162, 164, 166 in the template 160 cause the Web server to perform a variety of functions that are described next in response to a request from a client process for the Web resource. FIG. 2A is a block diagram that illustrates high level methods performed by a Web server based on statements in embodiment 200 of a network management web resource including template 160.

The statements in the network management Web resource 200 are segregated into a header block 202 and a body block 204. The header block 202 includes statements in block 210 that define common server-side network management functions and variables using the platform-dependent standard binary interface for at least some of the management functions. These definitions are made primarily using the platform-dependent scripting language.

The header block 202 also includes statements 230 that cause the Web server to initialize (begin building) a page to send to a requesting client process. These statements also are primarily in the platform-dependent scripting language, such as ASP, and are described in more detail below. For Web resources that requires some client-side functions, for example to verify that a user has made entries into required input fields, the client-side script 246 defining the function is included in the header block 202. Since the client platform where the client process is executing may be different than the platform of the Web server, the script for the client-side functions may be in a different scripting language. In the embodiment depicted in FIG. 2A, client-side script 246 is included in the header block 202. In one embodiment, the client-side script 246 is JavaScript for use on a client platform with a JavaScript-enabled browser.

In body block 204 of network management Web resource 200, the message received from the client requesting the network management Web resource is first processed in block 250. In block 250, the type of request is determined. In block 260, initial processing dependent on the type of request is performed. Block 260 includes calls to the standard network management methods to obtain the status of one or more network devices, or to reconfigure one or more network devices.

In the application-specific block 280, components of the graphical user interface are produced for including on the page returned to the client. For network management, the information included on the page is expected to include, at least in part, information obtained from the network devices using the standard methods defined in block 210 and calls in block 260. In step 290, the application-specific network management GUI is sent the client in response to the client's request.

According to this embodiment, the template includes all blocks of statements except block 280. A template so defined greatly facilitates the development of application-specific network management Web resources by automatically and consistently providing statements to perform a wide range of common network management steps.

Using Consistent Forms in Graphical User Interface (GUI)

According to one embodiment, the functionality performed in block 260 is greatly enhanced, and the complexity of code for block 280 is considerably reduced, if the developer providing application-specific code for block 280 uses different methods for receiving data returned from the client in response to the GUI generated.

One data return method should be used for obtaining information about a network device (getting operations), and a different data return method should be used for configuring the network device (setting operations). In this way a single, scripting-language file can handle both getting and setting operations regarding the network devices. Added advantages of using different data return methods are that consistent forms can be used for both getting and setting operations on network devices.

For example, an HTML form is used as the GUI in one embodiment. In this embodiment, information about a particular network device is associated with one or more input data fields of the HTML form. An HTML form includes the specified input fields and a submit button. Input fields and associated data are sent to a script as pairs, each pair made up of a keyword and a value. An HTML form also includes a "METHOD" attribute that specifies a method of returning data and an "ACTION" attribute that specifies the script to which the data are directed. HTML supports two values for the METHOD attribute; "GET" and "POST," and in ASP, there are five built-in server-side objects (Server, Request, Response, Application and Session). When the GET method is used, the Request.QueryString interface with a variable name is used to obtain a value. When the POST method is used, the Request.Form interface with a variable name is used to obtain a value.

According to this embodiment, a consistent form is used for getting and setting network device properties that has the same input fields and the same script name as the value for the ACTION attribute. The script name is the name of the file containing the network management Web resource. The only difference between the forms is the data return method. One return method is used for setting network device properties, and a different return method is used for getting network device properties. In the preferred embodiment, the GET method is used for getting network device properties; and the POST method is used for setting network device properties. In this embodiment, it is an advantage to use the POST method for setting network device properties, because potentially every property of the device may have a value to pass to the Web resource. There is no limit on a number of characters that can be passed in the standard input stream; while there is often a limit on the number of characters that can be passed in the HTML GET method. When getting network device properties, on the other hand, those values come from querying the network devices themselves and are not passed from the client process. Therefore no harm results from having too many input fields to fit in the Request.QueryString environmental variable during getting operations.

In another embodiment using consistent forms for getting and setting network device properties, a unique reference to a network device is included as a hidden field in the HTML form. A hidden field is not displayed to the user but is returned with the data to the script. In the preferred embodiments, each network device is identified by a unique reference obtained through one of the standard network management methods that invokes one of the methods of the device configuration DLL through the standard binary interface. By passing the unique reference to a network device as a hidden field, the reference is available for processing the information returned in the form, but the user is not exposed to the unique reference. This is an advantage because, on the one hand, the unique reference may be unintelligible to the user, and, on the other hand, it is not desirable that the user change the value during set operations. The input fields appropriate for one network device identified by the original unique reference are not necessarily relevant to a different network device indicated by a modified unique reference.

Using Standard Variables and Methods in a Web Resource Template

Figure 2B:
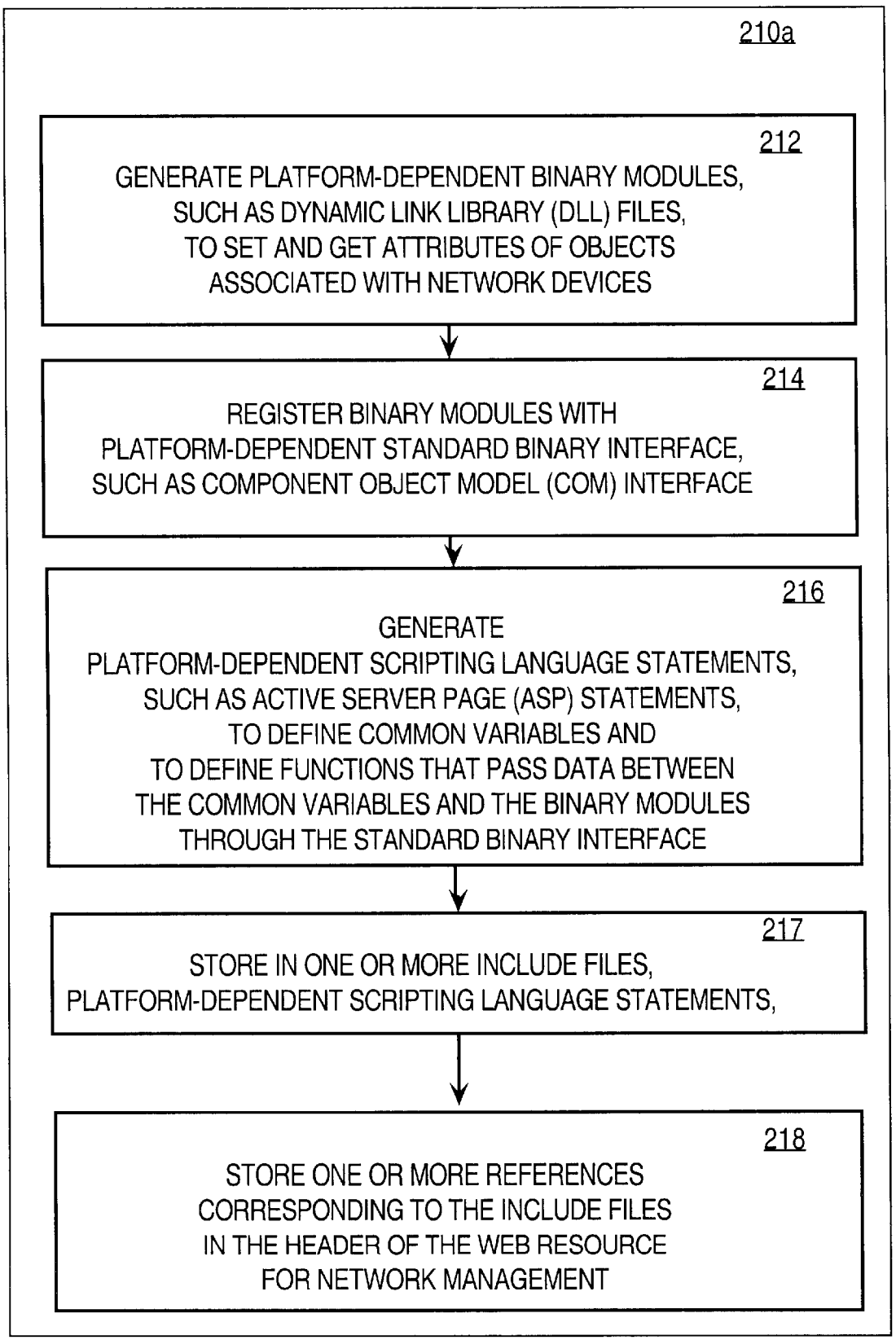
FIG. 2B is a flowchart that illustrates a method for performing step 210 of FIG. 2A.

The standard variables and network management methods are described in this section. FIG. 2B is a flowchart that illustrates an embodiment 210a of a method for performing step 210 of FIG. 2A.

In step 212, platform-dependent binary modules are generated to perform low-level network device management functions. For example, these binary modules accept input and, based in part on that input, generate commands in the operating system of the network devices. If information is returned from one of the network devices, output based on that information may be produced by the binary modules receiving the information. Lower-level network device management functions include:

querying each network device for its network address;
querying each network device for a list of its components;
handling an event sent by a network device (such as notification of component failure, notification of a backdoor change in hardware, notification of traffic reaching a threshold value, and system log events, among others);
querying each network device for its own attributes and values;
changing a value of an attribute for a network device;
forming a software object representing each network device;
generating a unique reference number for each network device;
building a hierarchy of objects representing the network; and
storing state information regarding past values for a attributes of a network device.

In the illustrated embodiment, these binary modules are dynamic link libraries used by existing network management applications. The functions performed by these binary modules are device-centric, not database centric. That is, these methods communicate directly with the network device to obtain its current status and changed settings. These methods do not rely on a database to obtain current settings of network devices. These methods provide information that is typically more up-to-date than information obtained from a database.

In step 214, platform dependent binary modules are registered with the platform dependent standard binary interface so that the binary modules can be employed using statements in a scripting language. In the illustrated embodiment, the platform is Windows 2000, the standard binary interface is the component object model (COM) interface specified by Microsoft Corp. COM supports interoperability and reusability of objects by allowing developers to build systems on reusable components from different sources that communicate via COM. COM defines an application programming interface (API) to allow creation of components for use in integrating custom applications or to allow diverse components to interact. In order to interact, components must adhere to a binary structure specified by Microsoft. As long as components adhere to this binary structure, components written different languages can interoperate. The COM objects are registered with a component database on the platform.

After registration, the network management DLLs are treated as COM objects. Access to them can be obtained through a COM CreateObject method. Using the COM interface, therefore, platform-dependent scripts can be written readily that perform device-centric operations. Such device-centric operations are difficult to program using a scripting language alone.

In step 216, the platform dependent scripting language statements that open the COM interface and create the COM objects based on the network management DLLs are written as part of the template. In addition, other common network management methods are written in the device dependent scripting language.

For example, routines are written in ASP for determining user login identifications and associated privileges. For example, it is determined whether the user is allowed to run this application because the user qualifies as a manager or network administrator.

As a further example, error-handling methods are written in ASP or Visual Basic script (VBScript) to check if there are any error messages. If so, the error message is displayed in a standard section on the page being generated for the client.

As a further example, routines are written in a platform-dependent scripting language to generate a page title for the page being generated for the client. Common page title generation provides a consistent look and feel across several Web resources, and also provides navigation cues to the user of the client process as the user drills down into the hierarchy of network devices.

As a further example, routines are written in JavaScript to verify input on the client-side. This simplifies verification without revealing too much business logic. Only simple checking is expected to be performed on the client-side. For example, client-side checking is used to determine whether a field is empty that must be filled.

As another example of common network management methods, routines in ASP are written to perform server-side verification, and to define page level variables. Page level variables are used to temporarily store network device properties between user input forms, and calls to the device-centric methods in the DLLs.

With respect to the COM interface, for example, the common network management methods are written in ASP to use the COM interface to perform the following:
- instantiate top level objects;
- assign values to variables;
- generate unique references for network devices;
- determine hierarchy of objects;
- obtain values of network device properties;
- set values for network device properties;
- pass commands of the network device operating system directly through to the network device;
- redirect the Web server to a new page if a backdoor change, i.e., a manual hardware change, is found; and
- synchronize values of network device properties (for example, last write attempted by several client processes wins, as in telnet protocols).

Placing Standard Variables and Methods in Include Files

In step 217, many of the platform-dependent script statements that define the common variables and common network management methods are stored in one or more include files. In this embodiment, in step 218, references to the include files are stored in the template portion of the network management Web resource. This arrangement offers the advantage that Web resources based on this template generate pages using script obtained from the include files. Since these include files are common among many network management Web resources generated from the same template, all the Web resources can be updated simply by updating the script in the include files.

In this embodiment, the references to the include files in the template perform the function of the block 210 in FIG. 2A to define common network management functions and variables.

Initializing Page with Standard Variables and Methods

Figure 2C:
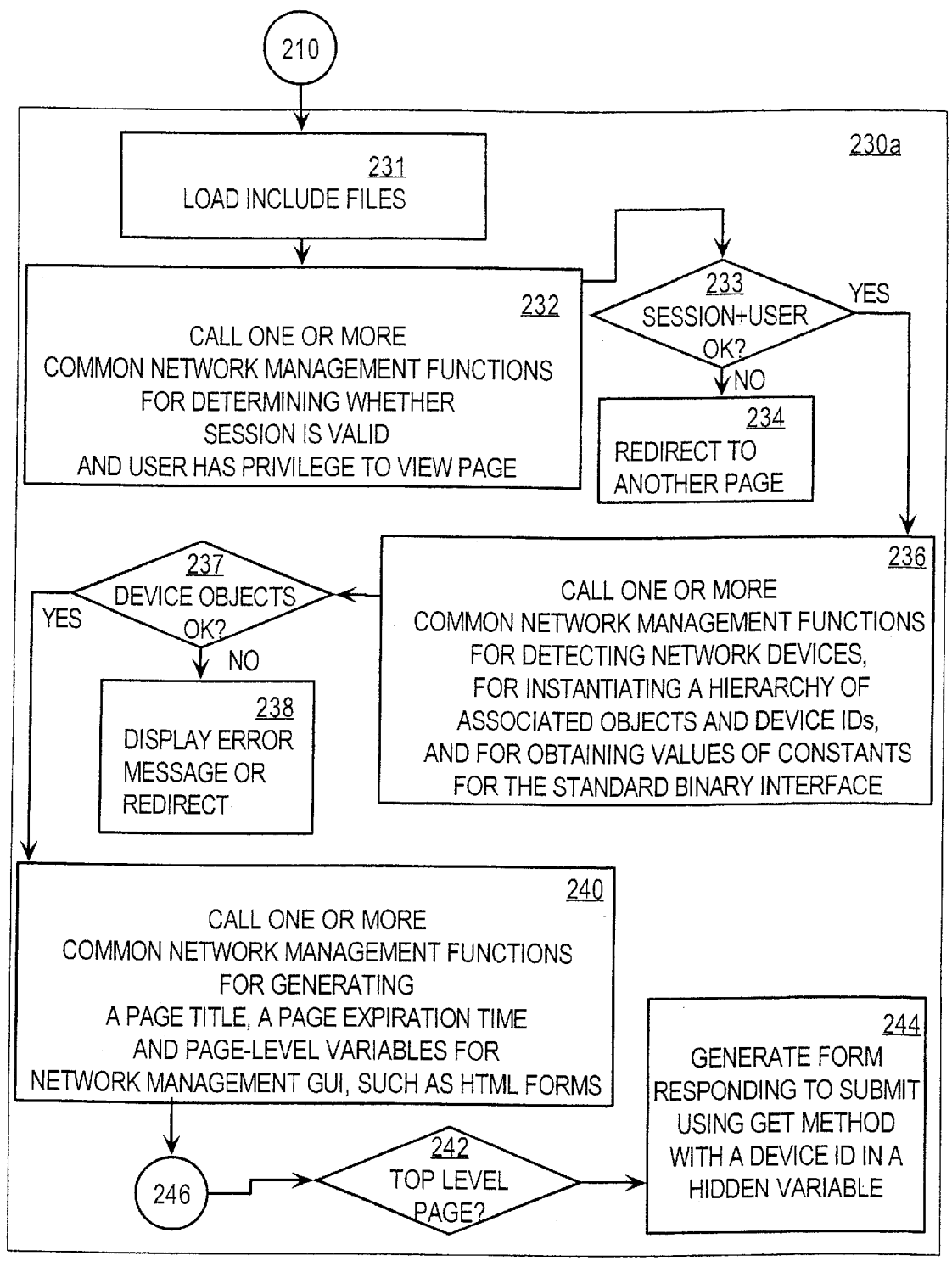
FIG. 2C is a flowchart that illustrates a method for performing step 230 of FIG. 2A.

FIG. 2C is a flowchart that illustrates an embodiment 230a of a method for performing step 230 of FIG. 2A to provide code used by the Web server to initialize a page requested by a client process.

In step 231, the include files referenced in code block 210 are loaded into memory by the Web server. In step 232, the common network management functions are called to determine whether the session is valid and the user has the necessary privilege to view the network management page. Step 233 represents the branch to step 234 if the session is invalid or the user lacks the necessary privilege. In step 234, the client process is redirected to another page, such as a page to deny access, or prompting the user to login again.

If the session is valid and the user has the necessary privilege, then control passes to step 236. In step 236, the script directs the Web server to call one or more of the common network management functions to detect the network devices, and to instantiate a hierarchy of associated objects and device identifications, and to obtain values of constants for the standard binary interface. After these calls, unique references to the network devices used by the page are available. For the first network management page at least one unique reference to one of the network devices must be supplied by the Web resource based on a query to the network devices themselves. Later pages may have a unique reference to a network device passed to the page as a parameter of the URL passed to the Web server.

Step 237 represents the branch to step 238 if there is an error in detecting the hierarchy of network devices and unique reference numbers. In step 238, an error message is sent for display at the client process, or the client process is redirected to another page.

If the network devices are successfully detected and uniquely referenced, control passes to step 240. In step 240, common network management functions are used to generate a page title and a page expiration time. Also initial values are assigned to the page level variables. Some of the values are based on information retrieved from the network devices during step 238. These page level variables may be used by the application-specific GUI executed later in the script. In step 246, the client side-script, such as the JavaScript, if any, is loaded by the Web server for passing to the client process with the page being generated.

At some point the user is presented with a form for getting or setting the properties of a particular network device. The particular network device is identified internally by its unique reference that was obtained during step 236. Before the user can set the properties of a network device, the user must first obtain the present values of the network device properties. The system maintains one top-level composite device object that contains a list of all devices known to the system. The first time a form is presented to the user for describing the properties of a particular network device, by default the first device in the list of the composite device object is selected and used in the form. Otherwise, the form is nearly blank and the return data method should indicate a GET method, according to the illustrated embodiment. In step 244, the form is generated with a return data method of GET and a unique reference for the default device in a hidden variable.

Processing a Submitted Form

Figure 2D:
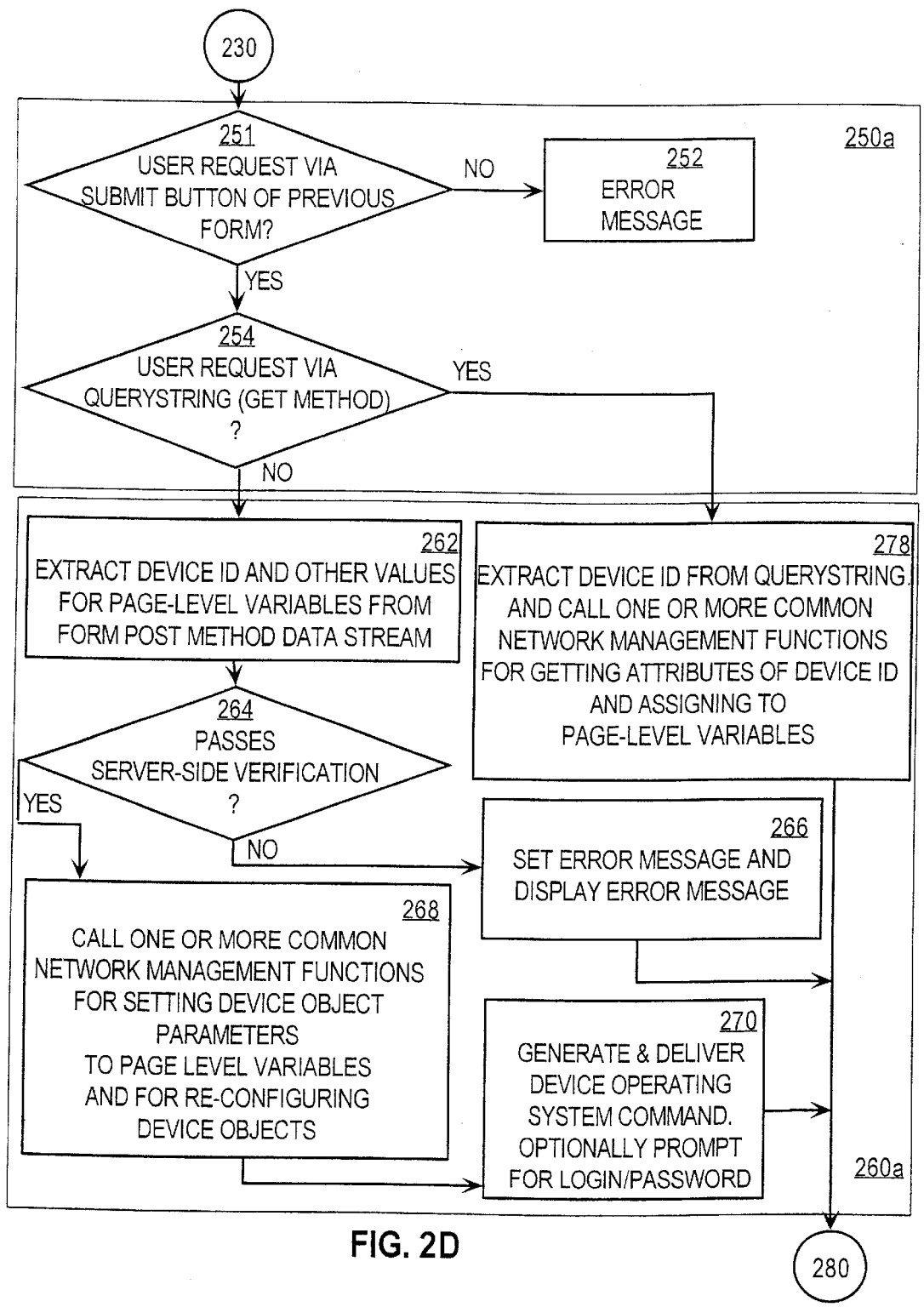
FIG. 2D is a flowchart that illustrates a method for performing step 250 of FIG. 2A.

FIG. 2D is a flowchart that illustrates embodiments 250a and 260a of methods for performing steps 250 and 260 of FIG. 2A. The processing depends on whether the user is getting or setting the network device properties. The template provides the ASP statements for the Web resource in code block 250 to determine which way the requests is to be processed, and in step 260 to do standard getting and setting processing.

In the illustrated embodiment, a consistent form is sent to the client process for display to the user for both getting and setting network device properties. Both forms have input fields associated with the configurable properties of the network device, and both indicate in the ACTION attribute that the current network management Web resource is the script that receives the return data. The forms differ in that data for getting network device properties is returned by the GET method in the ASP built-in Request.QueryString. Data for setting network device properties is returned by the POST method in the standard input stream.

If both the standard input stream and the Request.QueryString collection object are empty, then the script is not being executed in response to submitting a prior form. This embodiment of the script is not designed to handle this case, so an error message is produced. In step 251 of FIG. 2D, it is determined whether the user requests the current script as the result of selecting a submit button on a prior form. This check is performed by checking whether at least one of the Request.Form and the Request.QueryString is not empty. If both are empty, then the user request is not the result of selecting a submit button on a prior form, and control passes to step 252 where an error message is generated and sent to the client process for display to the user.

If the user requests is based on pressing a submit button of a prior form, then control passes to step 252 to determine which type of form was submitted. If the environmental variable Request.QueryString is not empty, then the request is in response to submitting a form with the GET method. According to the illustrated embodiment, such a form is used for getting network device properties, and control passes to step 278. In another embodiment, this determination is made based on whether a different variable is empty. The variable checked depends upon the data return method used by the application-specific GUI developed outside the template. Thus, this portion of the template described in step 250a is different in other embodiments with different return methods for the GUI.

In step 278, standard processing is performed based on calls to the common network management functions. The standard processing includes extracting the unique reference (device ID) from a hidden field in the Request.QueryString variable and sending a query to the network device so identified to return values of the network devices properties. The return values are stored temporarily in the page level variables reserved for them. Control then passes to step 280 to use the values in the page level variables to populate the next application-specific GUI presented to the client process for display to the user.

If the environmental variable Request.QueryString is empty, then the request is in response to submitting a form with the POST method. According to the illustrated embodiment, such a form is used for setting network device properties, and control passes to step 262.

In step 262, the standard processing includes extracting the unique reference device ID from the hidden field in the standard Request.Form.

In step 264, the standard network management methods are used to perform server-side verification of the data. If the data cannot pass verification, then control passes to step 266 which generates and displays an error message. If the data do pass server-side verification, then control passes to step 268 to continue processing.

In step 268, one or more of the common network management functions are called to set the network device properties of the object referenced by the unique device ID, representing the network device. The verified data in the Request.Form are assigned to the page level variables associated with the corresponding properties. Then calls are made to the standard network management functions that reconfigure network device properties based on the values in the page level variables. For example, as represented by step 270, the common network management function will call a device centric-method from the DLL through the COM interface, and the device-centric method will generate and deliver a command in the network device operating system. In some embodiments, during step 268, the values already in the page level variables are compared to the data returning in the data stream to identify those properties that are being changed. Then the standard set function and the resulting device operating system command are employed only for the changed properties.

In some circumstances, the network device will respond requesting a valid login password. One of the methods will provide the login password to complete the process, if possible. Control than passes to step 280.

In step 280, the application-specific GUI statements can use the values in the page level variables to populate the input fields of the form and send a form back to the client process. In this way, the user at the client process can edit the form to tweak the configuration of the particular device.

The processing done in step 280 is not controlled by the statements in the template, but instead are controlled by statements written by a user of the template and inserted into the resulting network management Web resource.

Building and Using a Web Resource Template

Figure 3:
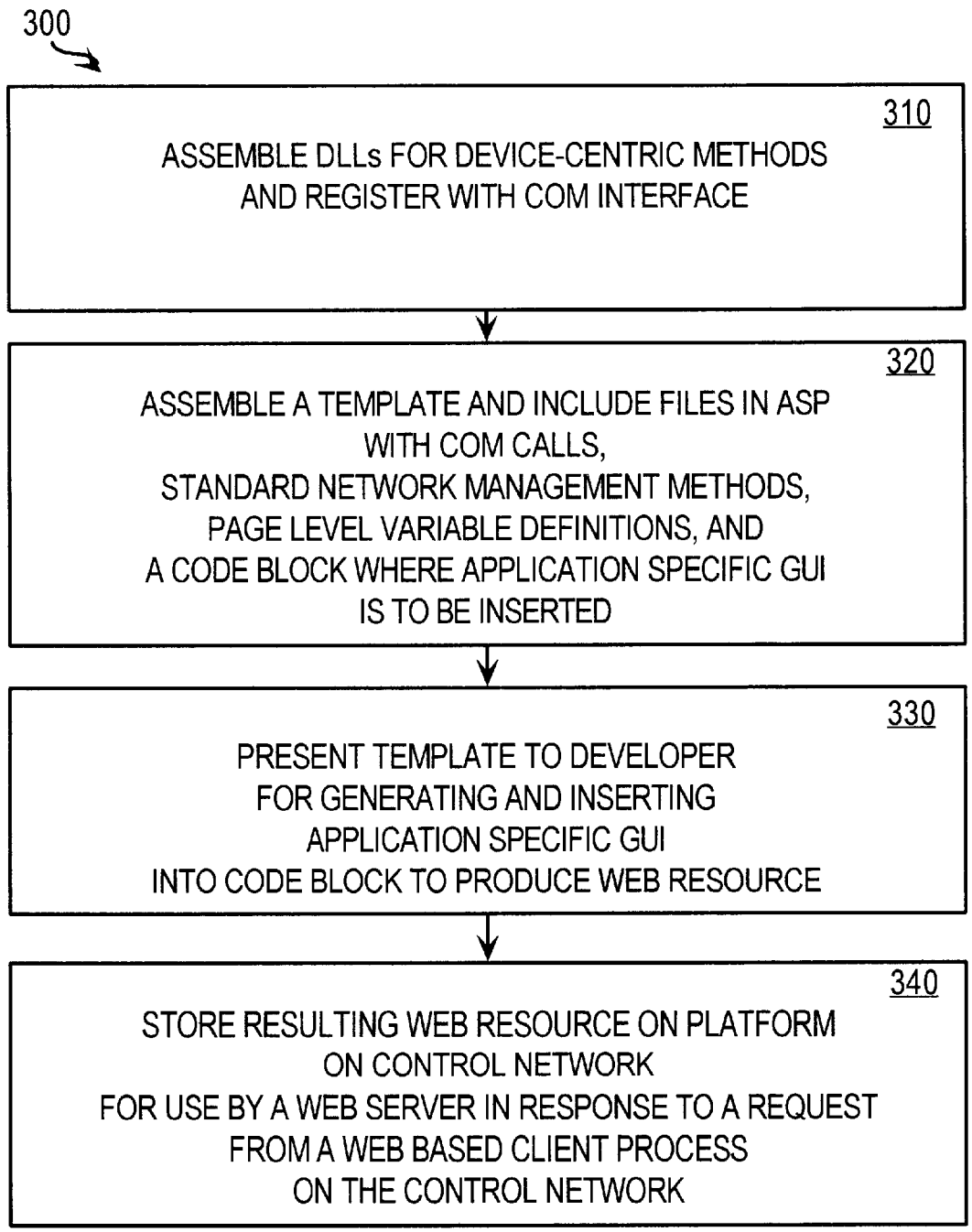
FIG. 3 is a flowchart that illustrates a high level method for building and using a web resource template according to an embodiment.

FIG. 3 is a flowchart that illustrates a high level method 300 for building and using a web resource template according to an embodiment.

In step 310, a template builder assembles the binary objects, such as DLLs, with device-centric methods, and registers them with a standard binary interface, such as the COM interface.

In step 320, the template builder defines and calls standard network management methods and page level variable definitions at least in part using statements of a platform-dependent scripting language, such as ASP, and calls to a standard binary interface, such as COM. In this embodiment, many of the statements are distributed among one or more include files. References to the include files are inserted in the template. A code block location is indicated where statements producing an application-specific GUI should be inserted into the template.

In step 330, the template is presented to an applications developer for generating and inserting statements to produce an application-specific GUI. In step 340, the resulting Web resource is stored on a platform connected to a control network. The network management Web resource is then available for use by a Web server to respond to request from a Web based client process also on the control network.

Hardware Overview

Figure 4:
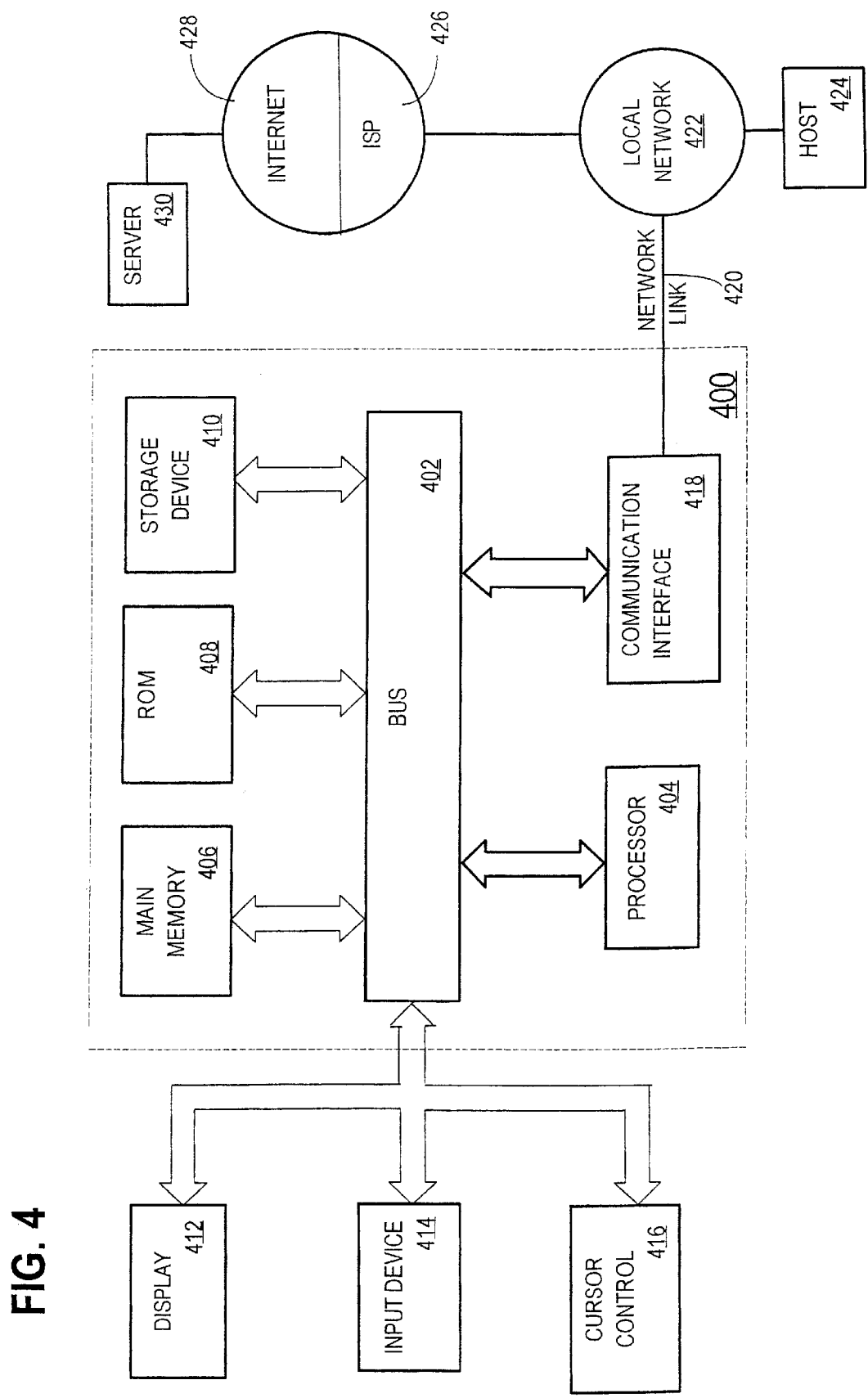
FIG. 4 is a block diagram that illustrates a computer system upon which an embodiment may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory ("RAM") or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory ("ROM") 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube ("CRT"), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for developing platform-dependent device-centric network management applications. According to one embodiment of the invention, network device configuration is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network ("ISDN") card or a modem to provide a data communication connection to a corresponding type of telephone line. As another example, communication interface 418 may be a local area network ("LAN") card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider ("ISP") 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for client-side verification as described herein.

The received code may be executed by processor 404 as it is received, and/or stored in storage device 410, or other non-volatile storage for later execution. In this manner, computer system 400 may obtain application code in the form of a carrier wave.

Conclusions

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computer implemented method of developing a platform-dependent, Web-based, device-centric network management server, the method comprising the steps of:

creating and storing, on a platform for controlling a network comprising a hierarchy of network devices, a collection of network device-centric methods in binary modules registered with a standard binary interface;

creating and storing a template for a Web resource comprising statements in a platform-dependent scripting language, the statements providing, standard management methods, at least one based on the standard binary interface to generate instances of the collection of network device-centric methods, page level variables for holding in memory values used as parameters for the standard binary interface, and a place to insert application specific statements into the Web resource for presenting network information to a Web-based client process and for receiving input from the Web-based client process;

presenting the template to a developer for generating and inserting the application specific statements into the Web resource; and storing a resulting Web resource on the platform connected to the network, for access by a Web server on the platform in response to a request from the Web-based client process on the network.

2. A computer implemented method of developing a platform-dependent, Web-based, device-centric network management server, the method comprising the steps of:

retrieving a template for a Web resource comprising statements in a platform-dependent scripting language, the statements providing, standard management methods, at least one based on a platform-dependent standard binary interface to generate instances of a collection of network device-centric methods stored as binary modules, page level variables for holding in memory values used as parameters for the standard binary interface, and a place to insert application-specific statements into the Web resource for presenting network information to a Web-based client process and for receiving input from the Web-based client process;

generating and inserting the application-specific statements into the Web resource; and storing a resulting Web resource on a platform associated with the platform-dependent scripting language, standard binary interface and binary modules, wherein the platform is connected to a network comprising a hierarchy of network devices, and the resulting Web resource is for access by a Web server on the platform in response to a request from a Web-based client process on the network.

3. A computer-readable medium for a computer platform comprising one or more processors and an operating system, the medium carrying a template for developing a platform-dependent network management Web resource, the template comprising:

one or more sequences of statements of a platform-dependent scripting language, which statements, when processed by a Web server executing on the platform, cause the Web server to perform the steps of, defining a plurality of standard management methods, calling at least a first standard management method of the plurality of standard management methods, and defining page level variables for holding in memory values used as parameters for the standard management methods; and a place to insert application-specific statements for presenting network information to a Web-based client process and for receiving input from the Web-based client process.

4. A computer-readable medium of claim 3, wherein:

the one or more sequences of statements further cause the Web server to perform the step of calling a platform-dependent standard binary interface to generate instances of a collection of network device-centric methods stored as platform-dependent binary modules; and at least a first standard management method is based on an instance of a network device-centric method of the collection.

5. A computer-readable medium as recited in claim 3, wherein the application specific statements comprise at least one of a markup language and the scripting language.

6. A computer-readable medium as recited in claim 3, wherein the operating system is a Windows 2000 operating system and the scripting language is Active Server Page.

7. A computer-readable medium as recited in claim 4, wherein the operating system is a Windows 2000 operating system and the standard binary interface is a Component Object Model (COM).

8. A computer-readable medium as recited in claim 4, wherein the collection of network device-centric methods includes:

a method to uniquely identify network devices on the network;

a method to query a particular network device regarding a configuration of the particular network device;

a method to query the particular network device regarding an operational status of the particular network device; and a method to change the configuration of the particular network device.

9. A computer-readable medium as recited in claim 4, wherein the network device-centric methods represent the network devices as objects in a hierarchy.

10. A computer-readable medium as recited in claim 3, wherein the standard management methods include at least one of user authentication, error detection, error handling, server-side verification, page title handling, detection and notification of hardware changes, and synchronization of configuration changes among a plurality of client processes.

11. A computer-readable medium as recited in claim 3, wherein the one or more sequences of statements further cause the Web server to perform the step of defining a hidden variable for session state information regarding at least one of a prior message from the client process and a prior result from a standard management method.

12. A computer-readable medium as recited in claim 4, wherein the one or more sequences of statements further cause the Web server to perform the steps of defining at least one of a constant for the standard binary interface, and a variable for a network device-centric method.

13. A computer-readable medium as recited in claim 3, wherein:

at least one of the plurality of standard methods and associated definition statements in the scripting language is stored in one or more include files; and the one or more sequences of statements further cause the Web server to perform the step of including the at least one of the plurality of standard methods and associated definition statements based on a reference to the one or more include files.

14. The computer-readable medium as recited in claim 3, wherein the template further comprises JavaScript for client-side verification.

15. A computer-readable medium as recited in claim 3, wherein the one or more sequences of the platform-dependent scripting language further causes the Web server to perform the steps of:

determining whether a particular data method of a plurality of return data methods for a form presented to the client process has a respective variable for returned data that is not empty;

calling a second standard management method to get values of properties of a particular network device, if a first variable associated with a first return method is not empty; and calling a third standard management method to set values of the properties of the particular network device based on information in a second variable associated with a second return method, if the second variable is not empty.

16. A computer system for developing a platform-dependent network management Web resource, the system comprising:

a platform including one or more processors executing an operating system and a Web server;

a computer readable memory connected to the one or more processors carrying, platform dependent binary modules for a collection of network-device centric methods, and a platform-dependent standard binary interface for generating instances of the collection of network device-centric methods; and a template comprising one or more sequences of statements of a platform-dependent scripting language, which statements cause the Web server to perform the steps of, defining a plurality of standard management methods, calling at least a first standard management method of the plurality of standard management methods, and defining page level variables for holding in memory values used as parameters for the standard management methods; and a place to insert application-specific statements for presenting network information to a Web-based client process and for receiving input from the Web-based client process.

17. An apparatus for developing a platform-dependent network management Web resource, the apparatus comprising:

a means for invoking platform-dependent binary modules for a collection of network-device centric methods to get and set network device configuration;

a means for calling a first standard management method of a plurality of standard management methods, wherein at least one of the standard management methods invokes at least one of the binary modules;

a means for defining page level variables for holding in memory values used as parameters for the standard management methods; and a means for inserting application-specific statements that call at least one of the standard management methods for presenting network information to a Web-based client process and for receiving input from the Web-based client process.

18. A method as recited in claim 1, further comprising the steps of:

preparing a page for sending to a Web-based client process from a Web-based server, the page comprising a form having a plurality of input fields and a submit button;

associating with the form one of a first submit method for obtaining information about a state of a particular network device, and a second submit method for changing the state of the particular network device;

sending the page to the client process; and in response to activation of the submit button in the client process, executing routines to operate on the particular network device based on a submit method associated with the form.

19. A method as recited in claim 18 wherein the form includes a hidden variable having a value for uniquely identifying the particular network device.

20. A method as recited in claim 18, wherein:

said executing routines to operate on the particular network device comprises, determining whether a first variable for data input associated with the first submit method is empty, and if it is determined that the first variable is not empty, then executing get routines to obtain information about the state of the particular network device, and assigning values for the plurality of input fields based on the information about the state of the particular network device; and the method further comprises sending the page to the client process including the form with the second submit method after said assigning.

21. A method as recited in claim 20, said executing routines to operate on the particular network device further comprising, if it is determined that the first variable is empty, then:

obtaining current values of the plurality of input fields from a second variable associated with the second submit method; and executing set routines to change the state of the particular network device based on the current values of the plurality of input fields.

22. A method as recited in claim 18, wherein:

the first submit method is a form get method returning values of the plurality of input fields in a first environmental variable; and the second submit method is a form post method returning values of the plurality of input fields in a second environmental variable.

23. A method as recited in claim 18, wherein:

the second submit method is a form get method returning values of the plurality of input fields in a first environmental variable; and the first submit method is a form post method returning values of the plurality of input fields in a second environmental variable.

24. A method as recited in claim 22, wherein the page is a Hypertext Markup Language (HTML) page; the first environmental variable is a "Request.QueryString"; and the second environmental variable is a Request.Form.

25. A method as recited in claim 18, wherein the steps of preparing a page and executing routines are performed by a processor configured based on statements of a scripting language in a single script file.

26. A method as recited in claim 25, wherein the form further comprises a reference to the single script file associated with activation of the submit button.

27. A computer-readable medium as recited in claim 3, further comprising one or more sequences of instructions for configuring network devices, which instructions, when executed by one or more processors, cause the one or more processors to carry out the steps of preparing a page for sending to a Web-based client process from a Web-based server, the page comprising a form having a plurality of input fields and a submit button;

associating with the form one of a first submit method for obtaining information about a state of a particular network device, and a second submit method for changing the state of the particular network device;

sending the page to the client process; and in response to activation of the submit button in the client process, executing routines to operate on the particular network device based on a submit method associated with the form.

28. A computer-readable medium as recited in claim 27, further comprising instructions which, when executed by the one or more processors, cause the one or more processors to carry out the steps of:

during said executing routines to operate on the particular network device,
determining whether a first variable for data input associated with the first submit method is empty, and if it is determined that the first variable is not empty, then
executing get routines to obtain information about the state of the particular network device, and
assigning values for the plurality of input fields based on the information about the state of the particular network device; and
sending the page to the client process including the form with the second submit method after said assigning.

29. A computer system as recited in claim 16, further comprising:

a network interface; and
wherein the one or more processors are connected to the network interface, the one or more processors configured for
preparing a page for sending to a Web-based client process from a Web-based server, the page comprising a form having a plurality of input fields and a submit button;
associating with the form one of
a first submit method for obtaining information about a state of a particular network device, and
a second submit method for changing the state of the particular network device;
sending the page to the client process; and
in response to activation of the submit button in the client process, executing routines to operate on the particular network device based on a submit method associated with the form.

30. An apparatus for configuring network devices as recited in claim 17, further comprising:

a means for preparing a page for sending to a Web-based client process from a Web-based server, the page comprising a form having a plurality of input fields and a submit button;
a means for associating with the form one of
a first submit method for obtaining information about a state of a particular network device, and
a second submit method for changing the state of the particular network device;
a means for sending the page to the client process; and
a means for executing routines to operate on the particular network device, in response to activation of the submit button in the client process based on a submit method associated with the form.

31. A computer implemented method, comprising the steps of:

providing at least one executable network management module operable on a target platform and registered with a platform specific interface;
providing a template comprising statements in a scripting language specific to the target platform and implementing at least one network management method based upon the interface and at least one page level variable for storing values of parameters for the network management method;
receiving application specific statements for incorporation into the template; and
storing the template on the target platform, thereby enabling development of an executable network management resource optimized for operation on the target platform.

32. A computer-readable storage medium for a computer platform, the medium carrying:

a template for developing a platform-dependent network management resource, the template comprising:
one or more statements of a platform-dependent scripting language, including at least one statement invoking at least one executable network management module and
an area for receiving application-specific statements that call at least one of the management methods invoking the at least one executable network management module and to exchange information between the network management module using at least one of a plurality of page level variables;
thereby enabling development of an executable network management resource optimized for operation on the target platform.

33. An apparatus, comprising:

a means for invoking at least one platform dependent binary module implementing network-device centric methods to get and set network device configuration;
a means for calling at least one of a plurality of management methods, wherein the at least one of the plurality of management methods invokes at least one of the binary modules; and
a means for receiving application-specific statements that call at least one of the management methods for presenting network information to a Web-based client process and for receiving input from the Web-based client process;
wherein the means for invoking platform-dependent binary modules and the means for calling at least one of a plurality of management methods enable development of a network management means optimized for operation on the target platform.

34. A computer system, comprising:

a platform including one or more processors interconnected to a storage device;
at least one of a plurality of network management modules registered with a platform specific interface, executable by the processors of the platform and storable in the storage device; and
a template comprising statements in a scripting language specific to the platform for exchanging information with the network management module using a page level variable, and having an area for receiving application specific statements for incorporation therein;
wherein the template and the at least one management module enable development of an executable network management resource optimized for operation on the target platform.

* * * * *